US008370530B2

(12) United States Patent
Tripathi et al.

(10) Patent No.: US 8,370,530 B2
(45) Date of Patent: Feb. 5, 2013

(54) METHOD AND SYSTEM FOR CONTROLLING NETWORK TRAFFIC IN A BLADE CHASSIS

(75) Inventors: Sunay Tripathi, San Jose, CA (US); Erik Nordmark, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1314 days.

(21) Appl. No.: 11/953,832

(22) Filed: Dec. 10, 2007

(65) Prior Publication Data

US 2009/0150883 A1 Jun. 11, 2009

(51) Int. Cl.
*G06F 15/16* (2006.01)
*G06F 15/173* (2006.01)

(52) U.S. Cl. .................. 709/250; 709/218; 709/226
(58) Field of Classification Search .......... 709/216–229, 709/249–250
See application file for complete search history.

(56) References Cited

U.S. PATENT DOCUMENTS

| | | | |
|---|---|---|---|
| 6,041,053 A | 3/2000 | Douceur et al. |
| 6,070,219 A | 5/2000 | McAlpine et al. |
| 6,131,163 A | 10/2000 | Wiegel |
| 6,163,539 A | 12/2000 | Alexander et al. |
| 6,269,401 B1 | 7/2001 | Fletcher et al. |
| 6,477,643 B1 | 11/2002 | Vorbach et al. |
| 6,594,775 B1 | 7/2003 | Fair |
| 6,600,721 B2 | 7/2003 | Edholm |
| 6,714,960 B1 | 3/2004 | Bitar et al. |
| 6,757,731 B1 | 6/2004 | Barnes et al. |
| 6,771,595 B1 | 8/2004 | Gilbert et al. |
| 6,831,893 B1 | 12/2004 | Ben Nun et al. |
| 6,859,841 B2 | 2/2005 | Narad et al. |
| 6,944,168 B2 | 9/2005 | Paatela et al. |
| 6,985,937 B1 | 1/2006 | Keshav et al. |
| 7,046,665 B1 | 5/2006 | Walrand et al. |
| 7,111,303 B2 | 9/2006 | Macchiano et al. |
| 7,146,431 B2 | 12/2006 | Hipp et al. |
| 7,177,311 B1 | 2/2007 | Hussain et al. |
| 7,200,704 B2 | 4/2007 | Njoku et al. |
| 7,260,102 B2 | 8/2007 | Mehrvar et al. |

(Continued)

FOREIGN PATENT DOCUMENTS

| | | |
|---|---|---|
| WO | 2005057318 A2 | 6/2005 |
| WO | 2008093174 A1 | 8/2008 |

OTHER PUBLICATIONS

Kumar, R., ASI and PCI Express: Complementary Solutions, Dec. 1, 2004, RTC Magazine, Retrieved from the Internet <rtcmagazine.com/articles/view/100274>, (5 pages).

(Continued)

*Primary Examiner* — Yasin Barqadle
(74) *Attorney, Agent, or Firm* — Osha Liang LLP

(57) ABSTRACT

In general, embodiments of the invention relates to a method for controlling network traffic in a chassis. The method includes assigning control of a network express manager located in the chassis to a control virtual machine selected from a number of virtual machines. The method further includes configuring the network express manager, by the control virtual machine, where the network express manager is configured to route network traffic in the chassis. The method further includes implementing a virtual network path using the network express manager, where the virtual network path includes a virtual wire between a first VNIC and a second VNIC, where the first VNIC is located in a first computer and the second VNIC is located in a second computer.

15 Claims, 10 Drawing Sheets

U.S. PATENT DOCUMENTS

| | | | |
|---|---|---|---|
| 7,313,142 | B2 | 12/2007 | Matsuo et al. |
| 7,450,498 | B2 | 11/2008 | Golia et al. |
| 7,502,884 | B1 | 3/2009 | Shah et al. |
| 7,512,769 | B1* | 3/2009 | Lowell et al. ............... 711/203 |
| 7,561,531 | B2 | 7/2009 | Lewites et al. |
| 7,620,955 | B1 | 11/2009 | Nelson |
| 7,633,955 | B1 | 12/2009 | Saraiya et al. |
| 7,688,838 | B1* | 3/2010 | Aloni et al. .................. 370/412 |
| 7,694,298 | B2 | 4/2010 | Goud et al. |
| 7,730,486 | B2 | 6/2010 | Herington |
| 7,937,447 | B1* | 5/2011 | Cohen et al. .................. 709/212 |
| 7,996,583 | B2* | 8/2011 | Wilkinson ..................... 710/33 |
| 2002/0052972 | A1 | 5/2002 | Yim |
| 2002/0080721 | A1 | 6/2002 | Tobagi et al. |
| 2003/0037154 | A1 | 2/2003 | Poggio et al. |
| 2003/0120772 | A1 | 6/2003 | Husain et al. |
| 2004/0015966 | A1 | 1/2004 | MacChiano et al. |
| 2004/0170127 | A1 | 9/2004 | Tanaka |
| 2004/0199808 | A1 | 10/2004 | Freimuth et al. |
| 2004/0202182 | A1 | 10/2004 | Lund et al. |
| 2004/0210623 | A1 | 10/2004 | Hydrie et al. |
| 2004/0267866 | A1 | 12/2004 | Carollo et al. |
| 2005/0111455 | A1 | 5/2005 | Nozue et al. |
| 2005/0135243 | A1 | 6/2005 | Lee et al. |
| 2005/0138620 | A1 | 6/2005 | Lewites |
| 2005/0182853 | A1 | 8/2005 | Lewites et al. |
| 2005/0251802 | A1 | 11/2005 | Bozek et al. |
| 2006/0041667 | A1 | 2/2006 | Ahn et al. |
| 2006/0045089 | A1 | 3/2006 | Bacher et al. |
| 2006/0070066 | A1 | 3/2006 | Grobman |
| 2006/0092928 | A1 | 5/2006 | Pike et al. |
| 2006/0174324 | A1 | 8/2006 | Zur et al. |
| 2006/0206300 | A1 | 9/2006 | Garg et al. |
| 2006/0206602 | A1 | 9/2006 | Hunter et al. |
| 2006/0233168 | A1 | 10/2006 | Lewites et al. |
| 2006/0236063 | A1 | 10/2006 | Hausauer et al. |
| 2006/0253619 | A1 | 11/2006 | Torudbakken et al. |
| 2007/0027973 | A1* | 2/2007 | Stein et al. .................... 709/223 |
| 2007/0047536 | A1 | 3/2007 | Scherer et al. |
| 2007/0078988 | A1* | 4/2007 | Miloushev et al. ........... 709/227 |
| 2007/0083723 | A1 | 4/2007 | Dey et al. |
| 2007/0101323 | A1 | 5/2007 | Foley et al. |
| 2007/0244937 | A1 | 10/2007 | Flynn et al. |
| 2007/0244972 | A1 | 10/2007 | Fan |
| 2008/0002683 | A1 | 1/2008 | Droux et al. |
| 2008/0005748 | A1 | 1/2008 | Mathew et al. |
| 2008/0019365 | A1 | 1/2008 | Tripathi et al. |
| 2008/0022016 | A1 | 1/2008 | Tripathi et al. |
| 2008/0022148 | A1* | 1/2008 | Barnea et al. ..................... 714/5 |
| 2008/0043765 | A1 | 2/2008 | Belgaied et al. |
| 2008/0144635 | A1 | 6/2008 | Carollo et al. |
| 2008/0171550 | A1 | 7/2008 | Zhao |
| 2008/0192648 | A1* | 8/2008 | Galles ........................... 370/254 |
| 2008/0225875 | A1 | 9/2008 | Wray et al. |
| 2008/0239945 | A1 | 10/2008 | Gregg |
| 2008/0253379 | A1 | 10/2008 | Sasagawa |
| 2008/0270599 | A1 | 10/2008 | Tamir et al. |
| 2008/0320117 | A1* | 12/2008 | Johnsen et al. ............... 709/221 |
| 2009/0006593 | A1 | 1/2009 | Cortes |
| 2009/0125752 | A1 | 5/2009 | Chan et al. |
| 2010/0046531 | A1 | 2/2010 | Louati et al. |

OTHER PUBLICATIONS

Martinez, R., Alfaro, F.J., and Sanchez, J.L., Providing Quality of Service Over Advanced Switching, Jan. 1, 2006, IEEE, Retrieved from the Internet, <ieeexplore.ieee.org/xpls/abs_all.jsp?arnumber=1655667&tag=1>, 10 pages.

Apani, Brave New World, Feb. 1, 2007, iSmile, Retrieved from the Internet, <isimile.com/PDFs/Apani_Segmentation_WP.pdf>, 8 pages.

Trapeze, Trapeze Overview, Jan. 1, 1998, USENIX, Retrieved from the Internet, <usenix.org/publications/library/proceedings/usenix98/full_papers/anderson/anderson_html/node4.html>, 2 pages.

Popuri, S., OpenSolaris Virtualization Technologies, Feb. 23, 2007, Retrieved from the Internet<hub.opensolaris.org/bin/view/Community+Group+advocacy/techdays%2Darchive/02D06%2D07>, 2 pages.

Goldenberg, D. et al.; "Zero Copy Sockets Direct Protocol over InfiniBand—Preliminary Implementation and Performance Analysis"; Proceedings of the 13th Symposium on High Performance Interconnects; Piscataway, NJ; Aug. 17-19, 2005; pp. 128-137 (10 pages).

"I/O Virtualization Using Mellanox InfiniBand and Channel I/O Virtualization (CIOV) Technology"; XP-002541674; 2007; Retrieved from the Internet: <http://www.mellanox.com/pdf/whitepapers/WP_Virtualize_with_IB.pdf>; pp. 1-16 (16 pages).

"InfiniBand Software Stack"; XP-002541744; Jan. 1, 2006; Retrieved from the Internet: <http://download.microsoft.com/download/c/3/1/c318044c-95e8-4df9-a6af-81cdcb3c53c5/Mellanox%20Technologies%20-%20Infiniband%20Software%20Stack%20-%20WinIB%20-%20external.PDF>, pp. 1-2 (2 pages).

Wheeler, B.; "10 Gigabit Ethernet in Servers: Benefits and Challenges"; XP-002541745; Jan. 2005; Retrieved from the Internet: <http://www.hp.com/products1/serverconnectivity/adapters/ethernet/10gbe/infolibrary/10GbE_White_Paper.pdf> (8 pages).

"Windows Platform Design Notes: Winsock Direct and Protocol Offload on SANs"; XP-002541746; Mar. 3, 2001; Retrieved from the Internet: <http://download.microsoft.com/download/1/6/1/161ba512-40e2-4cc9-843a-923143f3456c/WinsockDirect-ProtocolOffload.doc> (8 pages).

International Search Report from PCT/US2009/048594 dated Sep. 7, 2009 (4 pages).

Written Opinion from PCT/US2009/048594 dated Sep. 7, 2009 (1 page).

International Search Report dated Aug. 19, 2009 (3 pages).

International Preliminary Report on Patentability issued in PCT/US2009/035405, Dated Sep. 10, 2010. (9 Pages).

Tripathi, S.; "Crossbow Architectural Document"; Nov. 21, 2006; 19 pages.

Nordmark; E.; "IP Instances—Network Isolation Meets Zones"; presented at SVOSUG, Oct. 26, 2006; 28 pages.

Office Action in United States Patent and Trademark Office for U.S. Appl. No. 11/953,829, Mailed Aug. 4, 2010 (30 Pages).

Office Action in United States Patent and Trademark Office for U.S. Appl. No. 11/953,837, Mailed Jun. 11, 2010 (27 Pages).

Office Action in United States Patent and Trademark Office for U.S. Appl. No. 11/953,839, Mailed Aug. 19, 2010 (30 Pages).

Office Action in United States Patent and Trademark Office for U.S. Appl. No. 12/040,165, Mailed Feb. 8, 2010 (40 Pages).

Notice of Allowance in United States Patent and Trademark Office for U.S. Appl. No. 12/040,165, Mailed Oct. 29, 2010 (18 Pages).

Office Action in United States Patent and Trademark Office for U.S. Appl. No. 12/040,101, Mailed May 6, 2010 (39 Pages).

Office Action in United States Patent and Trademark Office for U.S. Appl. No. 11/953,842, Mailed Apr. 30, 2010 (39 Pages).

Final Office Action in United States Patent and Trademark Office for U.S. Appl. No. 11/953,842, Mailed Oct. 15, 2010 (32 Pages).

Office Action in United States Patent and Trademark Office for U.S. Appl. No. 12/040,105, Mailed Nov. 20, 2009 (93 Pages).

Final Office Action in United States Patent and Trademark Office for U.S. Appl. No. 12/040,105, Mailed May 26, 2010 (26 Pages).

Notice of Allowance in United States Patent and Trademark Office for U.S. Appl. No. 12/040,105, Mailed Oct. 5, 2010 (27 Pages).

Office Action in United States Patent and Trademark Office for U.S. Appl. No. 11/953,843, Mailed May 3, 2010 (169 Pages).

Final Office Action in United States Patent and Trademark Office for U.S. Appl. No. 11/953,843, Mailed Oct. 15, 2010 (33 Pages).

Office Action in United States Patent and Trademark Office for U.S. Appl. No. 12/053,666, Mailed Dec. 10, 2009 (36 Pages).

Final Office Action in United States Patent and Trademark Office for U.S. Appl. No. 12/053,666, Mailed Jun. 11, 2010 (27 Pages).

Notice of Allowance in United States Patent and Trademark Office for U.S. Appl. No. 12/053,666, Mailed Oct. 7, 2010 (15 Pages).

Office Action in United States Patent and Trademark Office for U.S. Appl. No. 12/053,676, Mailed Dec. 9, 2009 (41 Pages).

Notice of Allowance in United States Patent and Trademark Office for U.S. Appl. No. 12/053,676, Mailed Jul. 15, 2010 (20 Pages).

Final Office Action in United States Patent and Trademark Office for U.S. Appl. No. 12/040,101, Mailed Dec. 13, 2010 (25 Pages).

Tripathi, S.; "Solaris Networking—The Magic Revealed (Part I)"; Sunay Tripathi's Solaris Networking Weblog; Nov. 14, 2005, pp. 1-22 (22 pages).

Tripathi, S.; "CrossBow: Solaris Network Virtualization and Resource Control"; Crossbow Architectual Document, Nov. 21, 2006; 19 pages.

Nordmark, E. et al. ; "IP Instances Interface Document"; PSARC 2006/366, Dec. 28, 2006; 17 pages.

Nordmark, E.; "IP Instances Design Document"; PSARC 2006/366, Dec. 21, 2006; 38 pages.

Tripathi, S.; "CrossBow: Solaris Network Virtualization & Resource Control"; CrossBow Overview Document, Aug. 23, 2006; 12 pges.

Nordmark, E.; "IP Instances—Network Isolation Meets Zones"; presented at the SVOSUG meeting, Oct. 26, 2006; 28 pages.

Tripathi, S.; "CrossBow: Network Virtualization and Resource Control"; presented at the SVOSUG meeting, Aug. 24, 2006; 28 pages.

Tripathi, S.; "Crossbow: ReCap"; presented at an internal Sun Labs Open House presentation on Jun. 1, 2006, made public Aug. 2006; 23 pages.

Dovrolis, C., Thayer, B. and Ramanathan, P: "HIP: Hybrid Interrupt—Polling for the Network Interface", ACM SIGOPS Operating Systems Review, vol. 35, Iss. 4, Oct. 2001, (11 Pages).

* cited by examiner

METHOD AND SYSTEM FOR CONTROLLING NETWORK TRAFFIC IN A BLADE CHASSIS

CROSS-REFERENCE TO RELATED APPLICATIONS

The present application contains subject matter that may be related to the subject matter in the following U.S. applications filed on Dec. 10, 2007, and assigned to the assignee of the present application: "Method and System for Creating a Virtual Network Path" with U.S. application Ser. No. 11/953,829; "Method and System for Reconfiguring a Virtual Network Path" with U.S. application Ser. No. 11/953,837; "Method and System for Enforcing Resource Constraints For Virtual Machines Across Migration" with U.S. application Ser. No. 11/953,839; "Method and System for Monitoring Virtual Wires" with U.S. application Ser. No. 11/953,842; and "Method and System for Scaling Applications On A Blade Chassis" with U.S. application Ser. No. 11/953,843.

BACKGROUND

Conventionally, in the computer-related arts, a network is an arrangement of physical computer systems configured to communicate with each other. In some cases, the physical computer systems include virtual machines, which may also be configured to interact with the network (i.e., communicate with other physical computers and/or virtual machines in the network). Many different types of networks exist, and a network may be classified based on various aspects of the network, such as scale, connection method, functional relationship of computer systems in the network, and/or network topology.

Regarding connection methods, a network may be broadly categorized as wired (using a tangible connection medium such as Ethernet cables) or wireless (using an intangible connection medium such as radio waves). Different connection methods may also be combined in a single network. For example, a wired network may be extended to allow devices to connect to the network wirelessly. However, core network components such as routers, switches, and servers are generally connected using physical wires. Ethernet is defined within the Institute of Electrical and Electronics Engineers (IEEE) 802.3 standards, which are supervised by the IEEE 802.3 Working Group.

To create a wired network, computer systems must be physically connected to each other. That is, the ends of physical wires (for example, Ethernet cables) must be physically connected to network interface cards in the computer systems forming the network. To reconfigure the network (for example, to replace a server or change the network topology), one or more of the physical wires must be disconnected from a computer system and connected to a different computer system.

SUMMARY

In general, in one aspect, the invention relates to a method and system for creating and managing a virtual network path between virtual machines in a network, wherein the virtual machines are located on different computers connected to a chassis interconnect.

In general, in one aspect, the invention relates to a method for controlling network traffic in a chassis. The method includes assigning control of a network express manager located in the chassis to a control virtual machine selected from a plurality of virtual machines, wherein the plurality of virtual machines is located in a plurality of computers communicatively coupled with each other via a chassis interconnect in the chassis, wherein the plurality of virtual machines is associated with a plurality of virtual network interface cards (VNICs), and wherein the plurality of computers shares a physical network interface. The method further includes configuring the network express manager, by the control virtual machine, wherein the network express manager is configured to route network traffic in the chassis, and implementing a virtual network path using the network express manager, wherein the virtual network path comprises a virtual wire between a first VNIC selected from the plurality of VNICs and a second VNIC selected from the plurality of VNICs, wherein the first VNIC is located in a first computer selected from the plurality of computers, and wherein the second VNIC is located in a second computer selected from the plurality of computers.

In general, in one aspect, the invention relates to a blade chassis. The blade chassis includes a chassis interconnect, a physical network interface, a network express manager, a plurality of blades communicatively coupled with each other via the chassis interconnect, wherein the plurality of blades shares the physical network interface, wherein the plurality of blades comprises a plurality of virtual machines, and wherein the plurality of virtual machines is associated with a plurality of virtual network interface cards (VNICs). The blade chassis further includes a chassis processor configured to assign control of the network express manager to a control virtual machine selected from the plurality of virtual machines, wherein controlling the network express manager, by the control virtual machine, comprises configuring the network express manager to route network traffic in the blade chassis, and wherein network traffic is routed in the blade chassis over a virtual network path, wherein the virtual network path comprises a virtual wire between the a first VNIC selected from the plurality of VNICs and a second VNIC selected from the plurality of VNICs, wherein the first VNIC is located in a first blade selected from the plurality of blades, and wherein the second VNIC is located in a second blade selected from the plurality of blades.

In general, in one aspect, the invention relates to a computer readable medium comprising a plurality of executable instructions for controlling network traffic in a blade chassis, wherein the plurality of executable instructions comprises instructions to: assign control of a network express manager located in the blade chassis to a control virtual machine selected from a plurality of virtual machines, wherein the plurality of virtual machines is located in a plurality of blades communicatively coupled with each other via a chassis interconnect in the blade chassis, wherein the plurality of virtual machines is associated with a plurality of virtual network interface cards (VNICs), and wherein the plurality of blades shares a physical network interface; configure the network express manager, by the control virtual machine, wherein the network express manager is configured to route network traffic in the blade chassis; and implement a virtual network path using the network express manager, wherein the virtual network path further comprises a virtual wire between a first VNIC selected from the plurality of VNICs and a second VNIC selected from the plurality of VNICs, wherein the first VNIC is located in a first blade selected from the plurality of blades, and wherein the second VNIC is located in a second blade selected from the plurality of blades.

DETAILED DESCRIPTION

Figure 1:
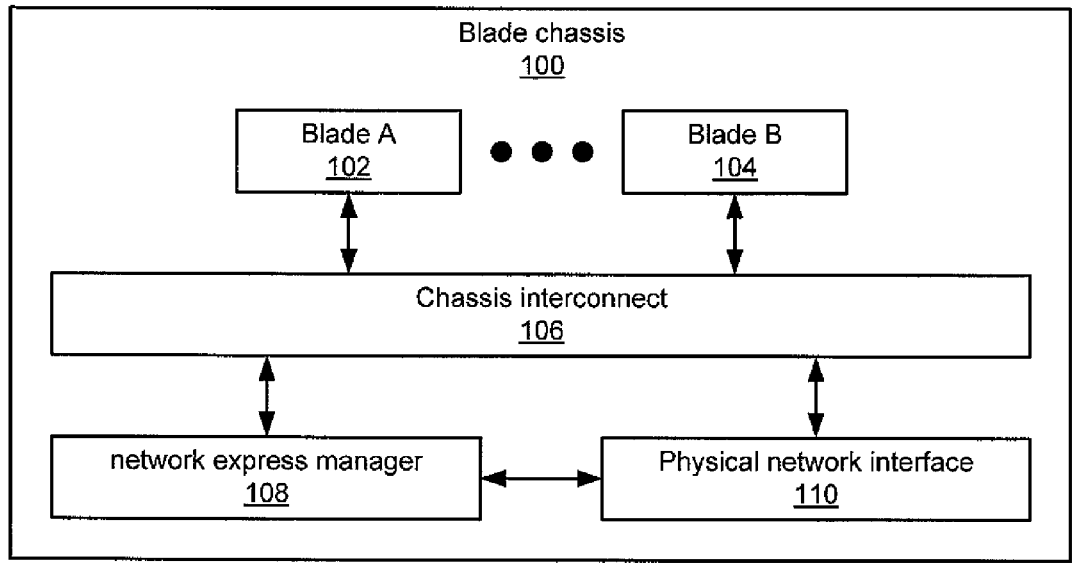
FIG. 1 shows a diagram of a blade chassis in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for controlling network traffic in a blade chassis. The blade chassis includes a network express manager and multiple blades. The blades include virtual machines associated with virtual network interface cards (VNICs). Control of the network express manager is assigned to one of the virtual machines, referred to a control virtual machine, and the control virtual machine configures the network express manager to route network traffic in the blade chassis. In one embodiment of the invention, the control virtual machine includes an operating system (referred to as the control operating system) to perform the functions of the control virtual machine (as discussed below). The network express manager is then used to implement a virtual network path in the blade chassis. The virtual network path includes one or more "virtual wires" for transmitting network traffic via the chassis interconnect. The concept of a virtual wire is discussed in detail below.

FIG. 1 shows a diagram of a blade chassis (100) in accordance with one or more embodiments of the invention. The blade chassis (100) includes multiple blades (e.g., blade A (102), blade B (104)) communicatively coupled with a chassis interconnect (106). For example, the blade chassis (100) may be a Sun Blade 6048 Chassis by Sun Microsystems Inc., an IBM BladeCenter® chassis, an HP BladeSystem enclosure by Hewlett Packard Inc., or any other type of blade chassis. The blades may be of any type(s) compatible with the blade chassis (100). BladeCenter® is a registered trademark of International Business Machines, Inc. (IBM), headquartered in Armonk, N.Y.

In one or more embodiments of the invention, the blades are configured to communicate with each other via the chassis interconnect (106). Thus, the blade chassis (100) allows for communication between the blades without requiring traditional network wires (such as Ethernet cables) between the blades. For example, depending on the type of blade chassis (100), the chassis interconnect (106) may be a Peripheral Component Interface Express (PCI-E) backplane, and the blades may be configured to communicate with each other via PCI-E endpoints. Those skilled in the art will appreciate that other connection technologies may be used to connect the blades to the blade chassis.

Continuing with the discussion of FIG. 1, to communicate with clients outside the blade chassis (100), the blades are configured to share a physical network interface (110). The physical network interface (110) includes one or more network ports (for example, Ethernet ports), and provides an interface between the blade chassis (100) and the network (i.e., interconnected computer systems external to the blade chassis (100)) to which the blade chassis (100) is connected. The blade chassis (100) may be connected to multiple networks, for example using multiple network ports.

In one or more embodiments, the physical network interface (110) is managed by a network express manager (108). Specifically, the network express manager (108) is configured to manage access by the blades to the physical network interface (110). The network express manager (108) may also be configured to manage internal communications between the blades themselves, in a manner discussed in detail below. The network express manager (108) may be any combination of hardware, software, and/or firmware including executable logic for managing network traffic.

Figure 2:
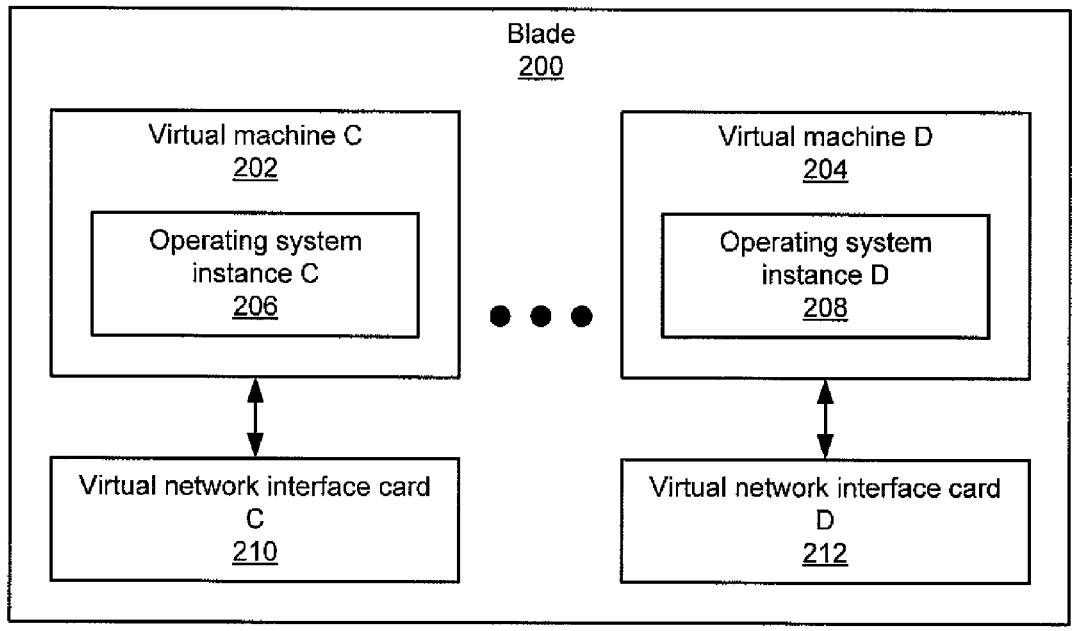
FIG. 2 shows a diagram of a blade in accordance with one or more embodiments of the invention.

FIG. 2 shows a diagram of a blade (200) in accordance with one or more embodiments of the invention. "Blade" is a term of art referring to a computer system located within a blade chassis (for example, the blade chassis (100) of FIG. 1). Blades typically include fewer components than stand-alone computer systems or conventional servers. In one embodiment of the invention, fully featured stand-alone computer systems or conventional servers may also be used instead of or in combination with the blades. Generally, blades in a blade chassis each include one or more processors and associated memory. Blades may also include storage devices (for example, hard drives and/or optical drives) and numerous other elements and functionalities typical of today's computer systems (not shown), such as a keyboard, a mouse, and/or output means such as a monitor. One or more of the aforementioned components may be shared by multiple blades located in the blade chassis. For example, multiple blades may share a single output device.

Continuing with discussion of FIG. 2, the blade (200) includes a host operating system (not shown) configured to execute one or more virtual machines (e.g., virtual machine C (202), virtual machine D (204)). Broadly speaking, the virtual machines are distinct operating environments configured to inherit underlying functionality of the host operating system via an abstraction layer. In one or more embodiments of the invention, each virtual machine includes a separate instance of an operating system (e.g., operating system instance C (206), operating system instance D (208)). For example, the Xen® virtualization project allows for multiple guest operating systems executing in a host operating system. Xen® is a trademark overseen by the Xen Project Advisory Board. In one embodiment of the invention, the host operating system supports virtual execution environments (not shown). An example of virtual execution environment is a Solaris™ Container. In such cases, the Solaris™ Container may execute in the host operating system, which may be a Solaris™ operating system. Solaris™ is a trademark of Sun Microsystems, Inc. In one embodiment of the invention, the host operating system may include both virtual machines and virtual execution environments.

Many different types of virtual machines and virtual execution environment exist. Further, the virtual machines may include many different types of functionality, such as a switch, a router, a firewall, a load balancer, an application server, any other type of network-enabled service, or any combination thereof.

In one or more embodiments of the invention, the virtual machines and virtual execution environments inherit network connectivity from the host operating system via VNICs (e.g., VNIC C (210), VNIC D (212)). To the virtual machines and the virtual execution environments, the VNICs appear as physical NICs. In one or more embodiments of the invention, the use of VNICs allows an arbitrary number of virtual machines or and virtual execution environments to share the blade's (200) networking functionality. Further, in one or more embodiments of the invention, each virtual machine or and virtual execution environment may be associated with an arbitrary number of VNICs, thereby providing increased flexibility in the types of networking functionality available to the virtual machines and/or and virtual execution environments. For example, a virtual machine may use one VNIC for incoming network traffic, and another VNIC for outgoing network traffic. VNICs in accordance with one or more embodiments of the invention are described in detail in commonly owned U.S. patent application Ser. No. 11/489,942, entitled "Multiple Virtual Network Stack Instances using Virtual Network Interface Cards," in the names of Nicolas G. Droux, Erik Nordmark, and Sunay Tripathi, the contents of which are hereby incorporated by reference in their entirety.

VNICs in accordance with one or more embodiments of the invention also are described in detail in commonly owned U.S. patent application Ser. No. 11/480,000, entitled "Method and System for Controlling Virtual Machine Bandwidth" in the names of Sunay Tripathi, Tim P. Marsland, and Nicolas G. Droux the contents of which are hereby incorporated by reference in their entirety.

Figure 3:
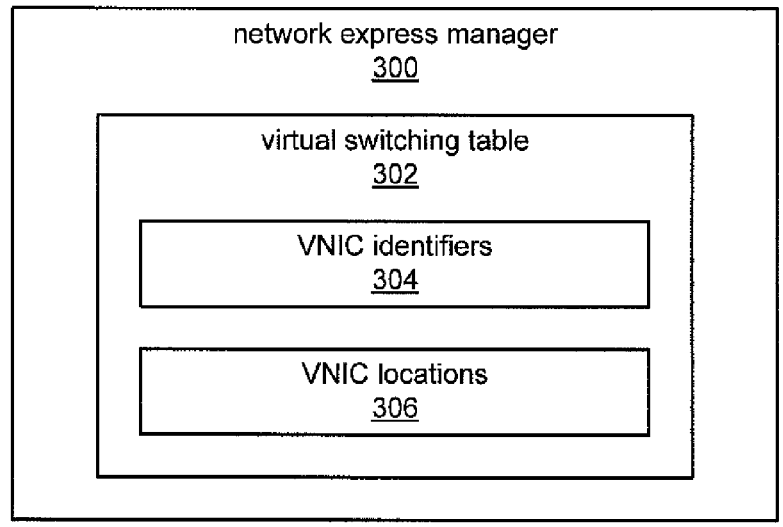
FIG. 3 shows a diagram of a network express manager in accordance with one or more embodiments of the invention.

As discussed above, each blade's networking functionality (and, by extension, networking functionality inherited by the VNICs) includes access to a shared physical network interface and communication with other blades via the chassis interconnect. FIG. 3 shows a diagram of a network express manager (300) in accordance with one or more embodiments of the invention. The network express manager (300) is configured to route network traffic traveling to and from VNICs located in the blades. Specifically, the network express manager (300) includes a virtual switching table (302), which includes a mapping of VNIC identifiers (304) to VNIC locations (306) in the chassis interconnect. In one or more embodiments, the VNIC identifiers (304) are Internet Protocol (IP) addresses, and the VNIC locations (306) are PCI-E endpoints associated with the blades (e.g., if the chassis interconnect is a PCI-E backplane). Alternatively, another routing scheme may be used.

In one or more embodiments, the network express manager (300) is configured to receive network traffic via the physical network interface and route the network traffic to the appropriate location (i.e., where the VNIC is located) using the virtual switching table (302). Further, the network express manager (300) may be configured to route network traffic between different VNICs located in the blade chassis. In one or more embodiments of the invention, using the virtual switching table (302) in this manner facilitates the creation of a virtual network path, which includes virtual wires. Thus, using the virtual switching table (302), virtual machines located in different blades may be interconnected to form an arbitrary virtual network topology, where the VNICs associated with each virtual machine do not need to know the physical locations of other VNICs. Further, if a virtual machine is migrated from one blade to another, the virtual network topology may be preserved by updating the virtual switching table (302) to reflect the corresponding VNIC's new physical location (for example, a different PCI-E endpoint).

In some cases, network traffic from one VNIC may be destined for a VNIC located in the same blade, but associated with a different virtual machine. In one or more embodiments of the invention, a virtual switch may be used to route the network traffic between the VNICs independent of the blade chassis. Virtual switches in accordance with one or more embodiments of the invention are discussed in detail in commonly owned U.S. patent application Ser. No. 11/480,261, entitled "Virtual Switch," in the names of Nicolas G. Droux, Sunay Tripathi, and Erik Nordmark, the contents of which are hereby incorporated by reference in their entirety.

Figure 4:
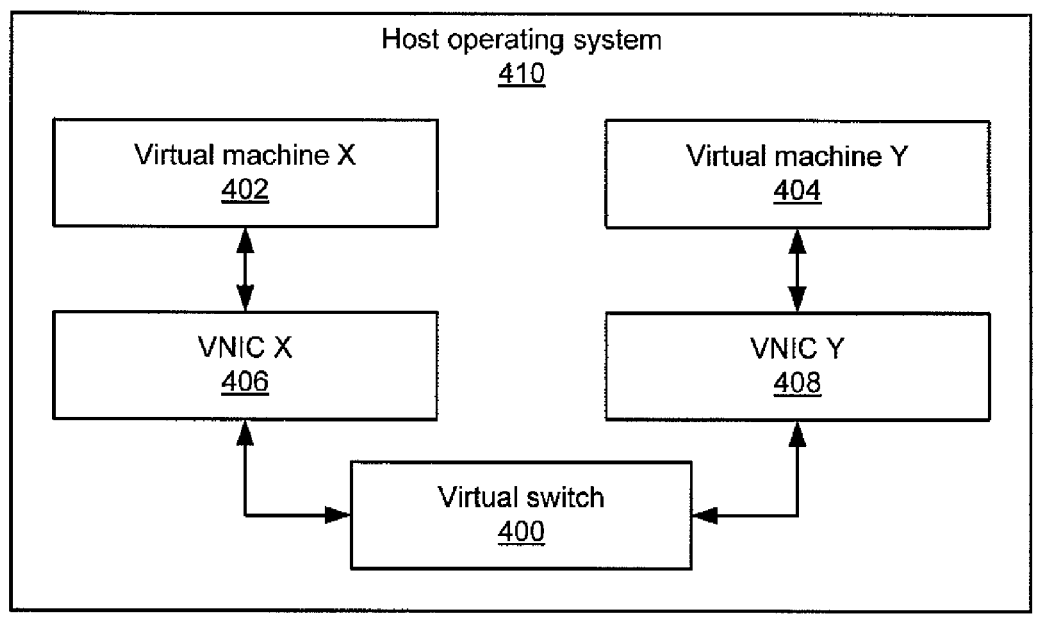
FIG. 4 shows a diagram of a virtual machine in accordance with one or more embodiments of the invention.

For example, FIG. 4 shows a diagram of a virtual switch (400) in accordance with one or more embodiments of the invention. The virtual switch (400) provides connectivity between VNIC X (406) associated with virtual machine X (402) and VNIC Y (408) associated with virtual machine Y (404). In one or more embodiments, the virtual switch (400) is managed by a host operating system (410) within which virtual machine X (402) and virtual machine Y (404) are located. Specifically, the host operating system (410) may be configured to identify network traffic targeted at a VNIC in the same blade, and route the traffic to the VNIC using the virtual switch (400). In one or more embodiments of the invention, the virtual switch (400) may reduce utilization of the blade chassis and the network express manager by avoiding unnecessary round-trip network traffic.

Figure 5:
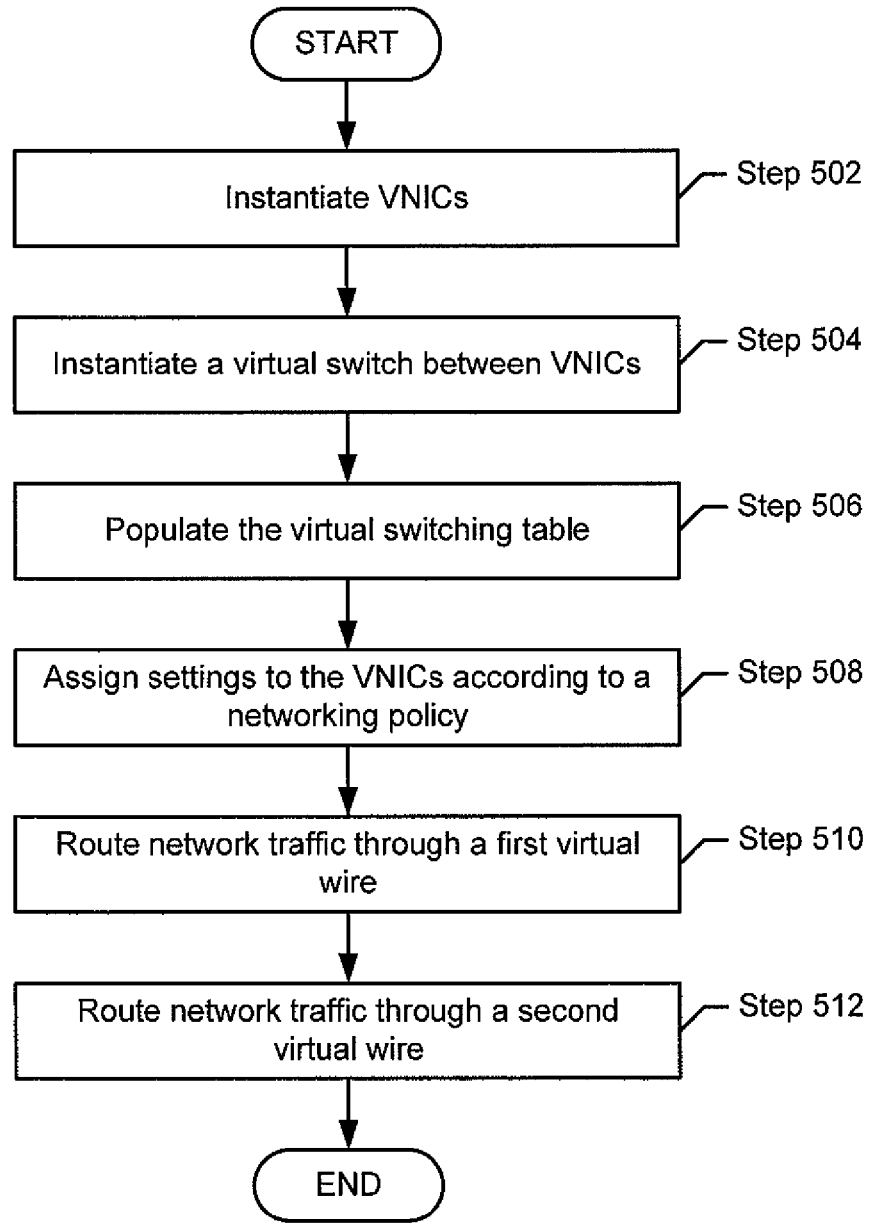
FIG. 5 shows a flowchart of a method for creating a virtual network path in accordance with one or more embodiments of the invention.

FIG. 5 shows a flowchart of a method for creating a virtual network path in accordance with one or more embodiments of the invention. In one or more embodiments of the invention, one or more of the steps shown in FIG. 5 may be omitted, repeated, and/or performed in a different order. Accordingly, embodiments of the invention should not be considered limited to the specific arrangement of steps shown in FIG. 5.

In one or more embodiments of the invention, in Step 502, VNICs are instantiated for multiple virtual machines. The virtual machines are located in blades, as discussed above. Further, the virtual machines may each be associated with one or more VNICs. In one or more embodiments of the invention, instantiating a VNIC involves loading a VNIC object in memory and registering the VNIC object with a host operating system, i.e., an operating system that is hosting the virtual machine associated with the VNIC. Registering the VNIC object establishes an interface between the host operating system's networking functionality and the abstraction layer provided by the VNIC. Thereafter, when the host operating system receives network traffic addressed to the VNIC, the host operating system forwards the network traffic to the VNIC. Instantiation of VNICs in accordance with one or more embodiments of the invention is discussed in detail in U.S. patent application Ser. No. 11/489,942, incorporated by reference above.

As discussed above, a single blade may include multiple virtual machines configured to communicate with each other. In one or more embodiments of the invention, in Step 504, a virtual switch is instantiated to facilitate communication between the virtual machines. As noted above, the virtual switch allows communication between VNICs independent of the chassis interconnect. Instantiation of virtual switches in accordance with one or more embodiments of the invention is discussed in detail in U.S. patent application Ser. No. 11/480,261, incorporated by reference above.

In one or more embodiments of the invention, in Step 506, a virtual switching table is populated. As noted above, the virtual switching table may be located in a network express manager configured to manage network traffic flowing to and from the virtual machines. Populating the virtual switching table involves associating VNIC identifiers (for example, Internet Protocol and/or Media Access Control (MAC) addresses) with VNIC locations (for example, PCI-E endpoints). In one or more embodiments of the invention, the virtual switching table is populated in response to a user command issued via a control operating system, i.e., an operating system that includes functionality to control the network express manager.

In one or more embodiments of the invention, VNICs include settings for controlling the processing of network packets. In one or more embodiments of the invention, in Step 508, settings are assigned to the VNICs according to a networking policy. Many different types of networking policies may be enforced using settings in the VNICs. For example, a setting may be used to provision a particular portion of a blade's available bandwidth to one or more VNICs. As another example, a setting may be used to restrict use of a VNIC to a particular type of network traffic, such as Voice over IP (VoIP) or Transmission Control Protocol/IP (TCP/IP). Further, settings for multiple VNICs in a virtual network path may be identical. For example, VNICs in a virtual network path may be capped at the same bandwidth limit, thereby allowing for consistent data flow across the virtual network path. In one or more embodiments of the invention, a network express manager is configured to transmit the desired settings to the VNICs.

In one or more embodiments of the invention, once the VNICs are instantiated and the virtual switching table is populated, network traffic may be transmitted from a VNIC in one blade to a VNIC in another blade. The connection between the two VNICs may be thought of as a "virtual wire," because the arrangement obviates the need for traditional network wires such as Ethernet cables. A virtual wire functions similar to a physical wire in the sense that network traffic passing through one virtual wire is isolated from network traffic passing through another virtual wire, even though the network traffic may pass through the same blade (i.e., using the same virtual machine or different virtual machines located in the blade).

Further, a combination of two or more virtual wires may be thought of as a "virtual network path." Specifically, transmitting network traffic over the virtual network path involves routing the network traffic through a first virtual wire (Step 510) and then through a second virtual wire (Step 512). For example, when receiving network traffic from a client via the physical network interface, one virtual wire may be located between the physical network interface and a VNIC, and a second virtual wire may be located between the VNIC and another VNIC.

Figure 6A:
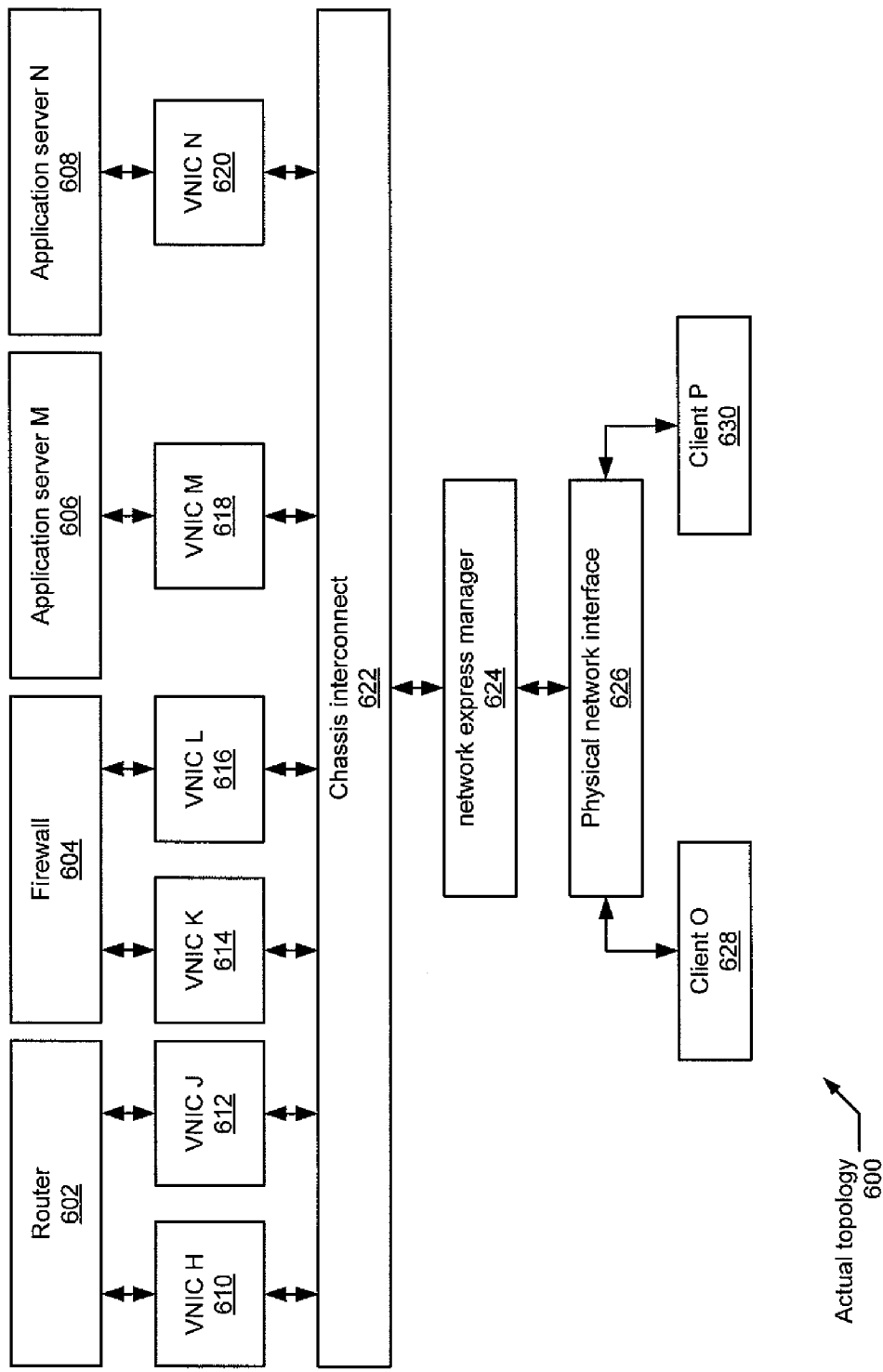
FIGS. 6A-6C show an example of creating virtual network paths in accordance with one or more embodiments of the invention.
Figure 6B:
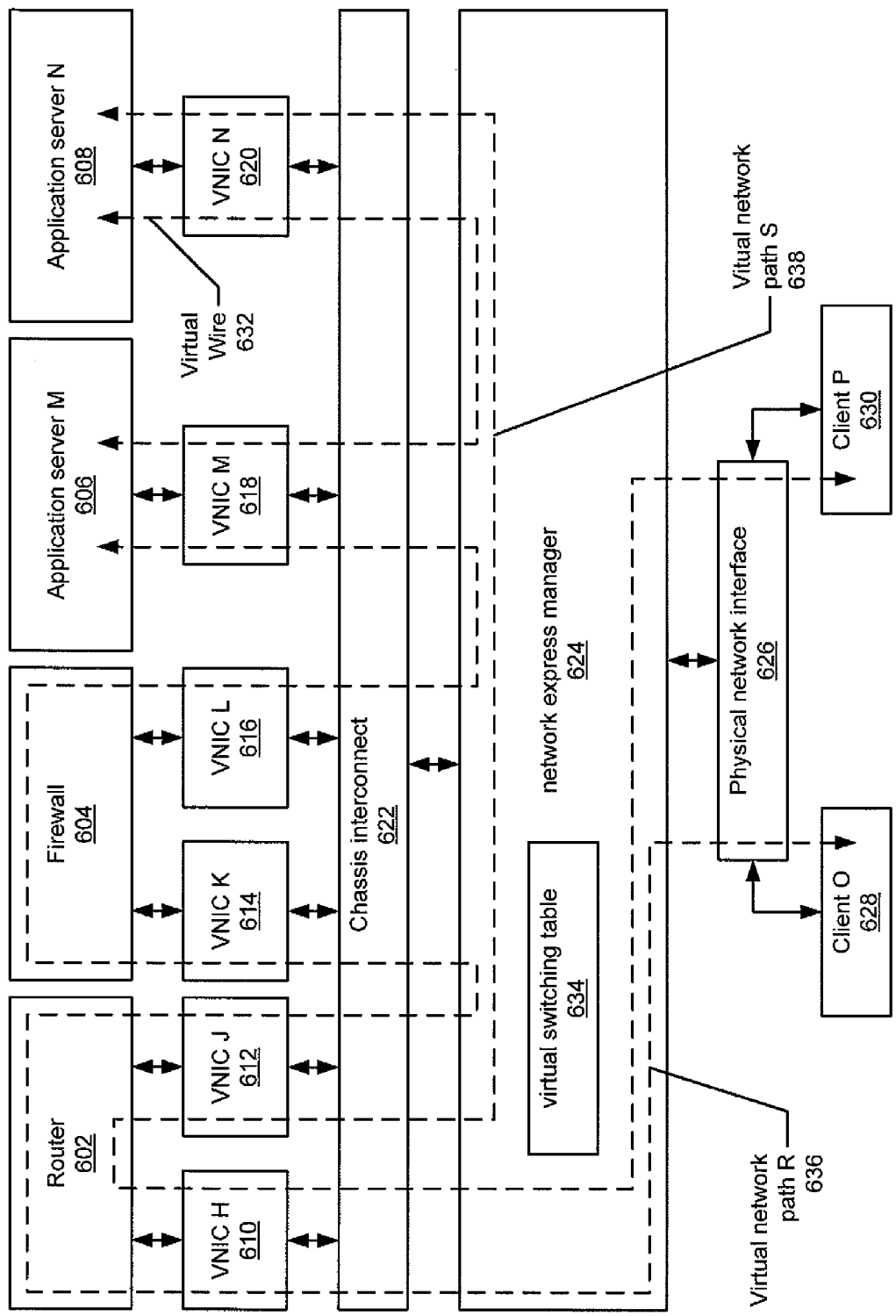
Figure 6C:
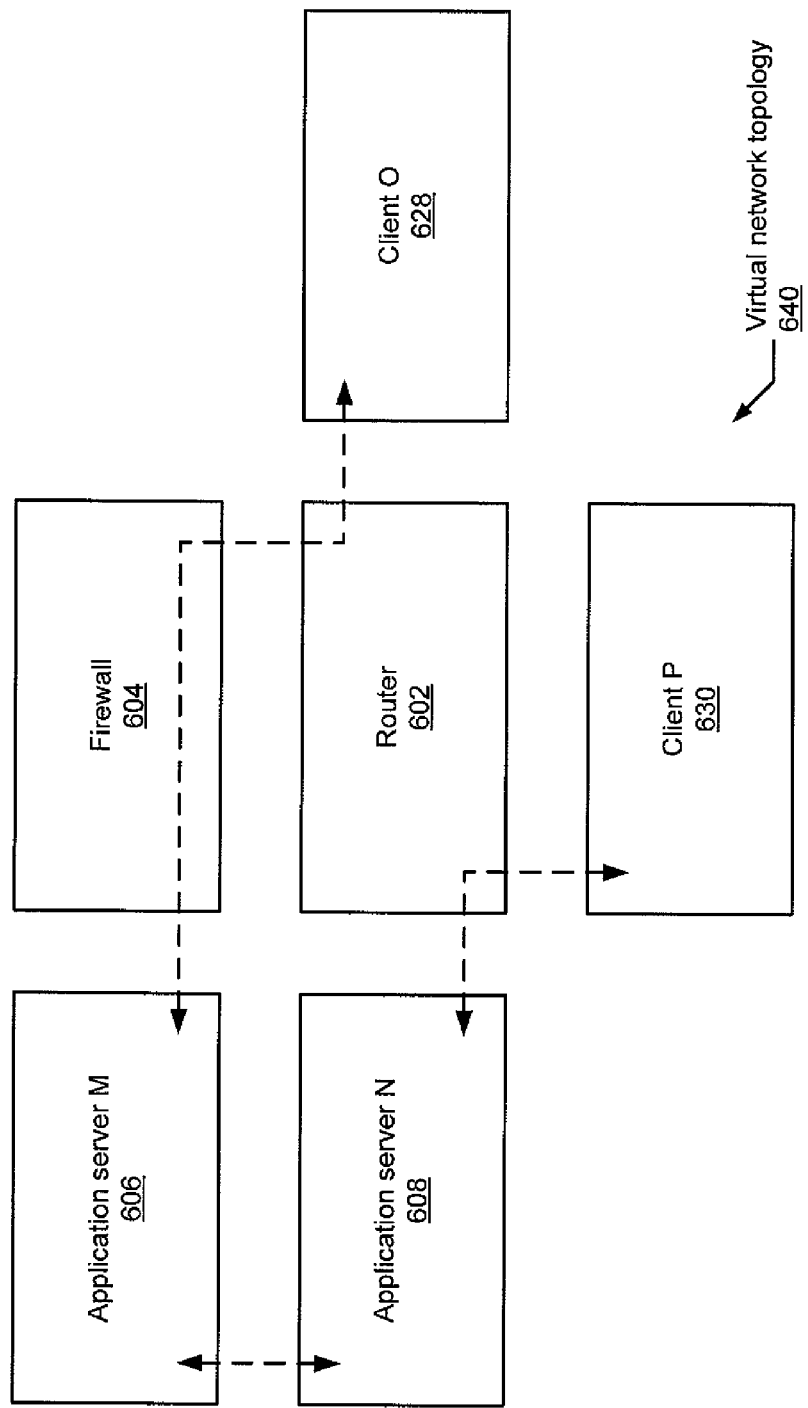

FIGS. 6A-6C show an example of creating virtual network paths in accordance with one or more embodiments of the invention. Specifically, FIG. 6A shows a diagram of an actual topology (600) in accordance with one or more embodiments of the invention, FIG. 6B shows how network traffic may be routed through the actual topology (600), and FIG. 6C shows a virtual network topology (640) created by routing network traffic as shown in FIG. 6B. FIGS. 6A-6C are provided as examples only, and should not be construed as limiting the scope of the invention.

Referring first to FIG. 6A, the actual topology (600) includes multiple virtual machines. Specifically, the actual topology (600) includes a router (602), a firewall (604), application server M (606), and application server N (608), each executing in a separate virtual machine. The virtual machines are located in blades communicatively coupled with a chassis interconnect (622), and include networking functionality provided by the blades via VNICs (i.e., VNIC H (610), VNIC J (612), VNIC K (614), VNIC M (618), and VNIC N (620)). For ease of illustration, the blades themselves are not included in the diagram.

In one or more embodiments of the invention, the router (602), the firewall (604), application server M (606), and application server N (608) are each located in separate blades. Alternatively, as noted above, a blade may include multiple virtual machines. For example, the router (602) and the firewall (604) may be located in a single blade. Further, each virtual machine may be associated with a different number of VNICs than the number of VNICs shown in FIG. 6A.

Continuing with discussion of FIG. 6A, a network express manager (624) is configured to manage network traffic flowing to and from the virtual machines. Further, the network express manager (624) is configured to manage access to a physical network interface (626) used to communicate with client O (628) and client P (630). In FIG. 6A, the virtual machines, VNICs, chassis interconnect (622), network express manager (624), and physical network interface (626) are all located within a chassis interconnect. Client O (628) and client P (630) are located in one or more networks (not shown) to which the chassis interconnect is connected.

FIG. 6B shows how network traffic may be routed through the actual topology (600) in accordance with one or more embodiments of the invention. In one or more embodiments of the invention, the routing is performed by the network express manager (624) using a virtual switching table (634).

As discussed above, network traffic routed to and from the VNICs may be thought of as flowing through a "virtual wire." For example, FIG. 6B shows a virtual wire (632) located between application server M (606) and application server N (608). To use the virtual wire, application server M (606) transmits a network packet via VNIC M (618). The network packet is addressed to VNIC N (620) associated with application server N (608). The network express manager (624) receives the network packet via the chassis interconnect (622), inspects the network packet, and determines the target VNIC location using the virtual switching table (634). If the target VNIC location is not found in the virtual switching table (634), then the network packet may be dropped. In this example, the target VNIC location is the blade in which VNIC N (620) is located. The network express manager (624) routes the network packet to the target VNIC location, and application server N (608) receives the network packet via VNIC N (620), thereby completing the virtual wire (632). In one or more embodiments of the invention, the virtual wire (632) may also be used to transmit network traffic in the opposite direction, i.e., from application server N (608) to application server M (606).

Further, as discussed above, multiple virtual wires may be combined to form a "virtual network path." For example, FIG. 6B shows virtual network path R (636), which flows from client O (628), through the router (602), through the firewall (604), and terminates at application server M (606). Specifically, the virtual network path R (636) includes the following virtual wires. A virtual wire is located between the physical network interface (626) and VNIC H (610). Another virtual wire is located between VNIC J (612) and VNIC K (614). Yet another virtual wire is located between VNIC L (616) and VNIC M (618). If the router (602) and the firewall (604) are located in the same blade, then a virtual switch may be substituted for the virtual wire located between VNIC J (612) and VNIC K (614), thereby eliminating use of the chassis interconnect (622) from communications between the router (602) and the firewall (604).

Similarly, FIG. 6B shows virtual network path S (638), which flows from client P (630), through the router (602), and terminates at application server N (608). Virtual network path S (638) includes a virtual wire between the physical network interface (626) and VNIC H (610), and a virtual wire between VNIC J (612) and VNIC N (620). The differences between virtual network path R (636) and virtual network path S (638) exemplify how multiple virtual network paths may be located in the same blade chassis.

In one or more embodiments of the invention, VNIC settings are applied separately for each virtual network path. For example, different bandwidth limits may be used for virtual network path R (636) and virtual network path S (638). Thus, the virtual network paths may be thought of as including many of the same features as traditional network paths (e.g., using Ethernet cables), even though traditional network wires are not used within the blade chassis. However, traditional network wires may still be required outside the blade chassis, for example between the physical network interface (626) and client O (628) and/or client P (630).

FIG. 6C shows a diagram of the virtual network topology (640) resulting from the use of the virtual network path R (636), virtual network path S (638), and virtual wire (632) shown in FIG. 6B. The virtual network topology (640) allows the various components of the network (i.e., router (602), firewall (604), application server M (606), application server N (608), client O (628), and client P (630)) to interact in a manner similar to a traditional wired network. However, as discussed above, communication between the components located within the blade chassis (i.e., router (602), firewall (604), application server M (606), and application server N (608)) is accomplished without the use of traditional network wires.

Figure 7:
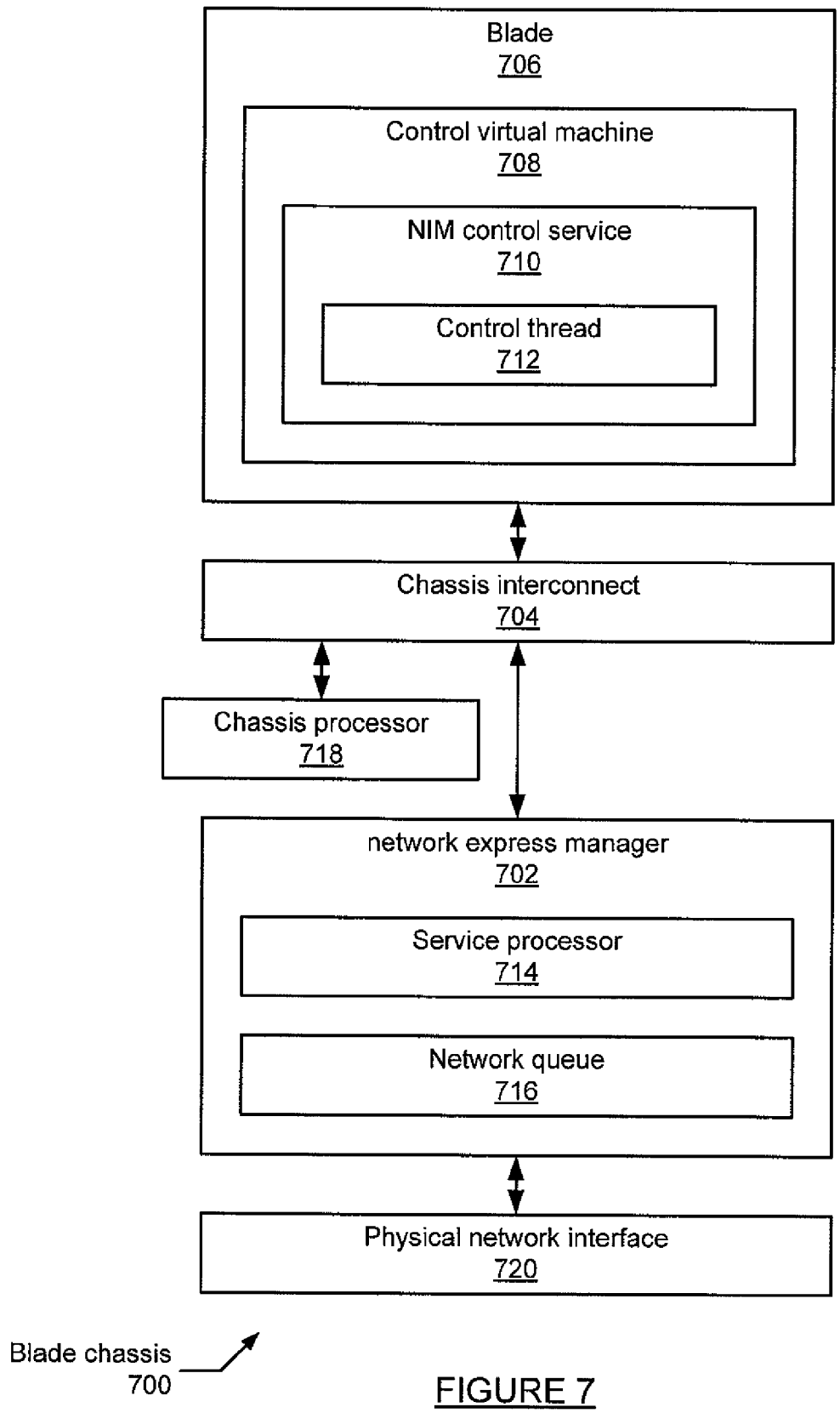
FIG. 7 shows a diagram of a blade chassis in accordance with one or more embodiments of the invention.

As noted above, the network express manager may be controlled by one of the virtual machines, referred to as a control virtual machine. FIG. 7 shows a diagram of a blade chassis (700) in accordance with one or more embodiments of the invention. The blade chassis (700) includes a chassis interconnect (704) communicatively coupled with a network express manager (702) and a blade (706). For ease of illustration, other blades communicatively coupled with the chassis interconnect (704) have been omitted from FIG. 7.

In one or more embodiments, in addition to the virtual switching table (300 in FIG. 3) (not shown in FIG. 7), the network express manager (702) includes a service processor (714) and a network queue (716). The network queue (716) is configured to store network traffic received from a network via a physical network interface (720), and network traffic received from blades via the chassis interconnect (704). The service processor (714) is configured to access network traffic pending in the network queue (716) and route the network traffic to the appropriate destination(s) via the appropriate VNICs located in blades in the blade chassis. In one or more embodiments of the invention, routing the network traffic involves classifying the network traffic by the service processor (714).

In one or more embodiments of the invention, the service processor (714) analyzes information in headers of the network traffic (i.e., network packet headers) to determine the destination of the network traffic. For example, the service processor (714) may extract an IP address from the header of a packet and use a classification policy to determine which VNIC to send the packet to. Once the VNIC is identified, the packet is placed in the appropriate receive buffer (not shown) in the network express manager (702). The network traffic is temporarily stored in the receive buffer until requested by (or sent to) the VNIC. A mechanism by which packets may be communicated to the VNIC is discussed above. The network express manager (702) uses the virtual switching table to communicate packets between the receive buffer and the VNIC.

In one or more embodiments of the invention, the service processor (714) may use any data (or combination of data) from or about the packet as the basis for the classification. Further, the classification policy may be any policy which defines how to place received packets in the appropriate receive buffers. For example, the classification policy may direct all network traffic for a specific subnet to a first receive buffer and all other network traffic to a second receive buffer.

Continuing with the discussion of FIG. 7, in one or more embodiments, the blade chassis (700) includes a chassis processor (718). The chassis processor (718) is located in the blade chassis (700) apart from the blades. In other words, the chassis processor (718) is "owned" by the blade chassis (700) and is not "owned" by any particular blade. In one or more embodiments, the chassis processor (718) is configured to perform various functions for the blade chassis (700).

Specifically, in one or more embodiments, the chassis processor (718) is configured to assign control of the network express manager (702) to a control virtual machine (708) located in the blade (706). In one or more embodiments, assigning control of the network express manager (702) to the control virtual machine (708) involves mapping the service processor (714) as a physical device in the control virtual machine (708).

In one or more embodiments, the service processor (714) is not visible to the control virtual machine (708) until the service processor (714) is mapped as a physical device to the control virtual machine (708). Further, after the service processor (714) is mapped to the control virtual machine (708), the service processor (714) is not visible to any of the other virtual machines executing on any blade in the blade chassis. Thus, while other blades (those that do not have control of the network express manager (702) inherently use functionality of network express manager (702), the other blades do not have any control over the configuration of the network express manager (702). In one or more embodiments of the invention, only a single control virtual machine (708) is assigned control of the network express manager (702). Alternatively, multiple control virtual machines (not shown) may be used, for example for load balancing and/or redundancy purposes. In one or more embodiments of the invention, to ensure exclusive control of the network express manager (702), the chassis processor (718) is configured to exchange a security key (for example, a predetermined encryption key) with the control virtual machine (708). Any processes that do not have the appropriate security key are not granted access to control the network express manager (702).

In one or more embodiments of the invention, to control the network express manager (702), the control virtual machine (708) includes a network express manager control service (710) executing a control thread (712). The control thread (712) is configured to manage routing of network traffic by the service processor (714). For example, the control thread (712) may be configured to assign one or more classification policies to the service processor (714). Further, the control thread (712) may be used to populate and subsequently update a virtual switching table (not shown) in the network express manager (702).

In one or more embodiments of the invention, the control virtual machine (708) is configured to migrate to another blade (not shown). For example, the control virtual machine (708) may be configured to detect a fault in the blade (706), and migrate to another blade based on the fault. The migration may be based on many different types of faults, such as a bad hard drive sector, a dropped network packet, or a memory fault. In one or more embodiments of the invention, the migration is performed to ensure that the control virtual machine (708) is able to continue controlling the network express manager (702), even if the blade (706) fails (i.e., experiences a "fatal" fault that would prevent the control virtual machine (708) from properly controlling the network express manager (702)). A method for migrating the control virtual machine (708) in accordance with one or more embodiments of the invention is discussed below. In one or more embodiments of the invention, policies for migrating the control virtual machine (708) are enforced by the chassis processor (718). For example, the chassis processor (718) may identify which fault(s) trigger a migration and/or to which blade to migrate the control virtual machine (708).

Figure 8:
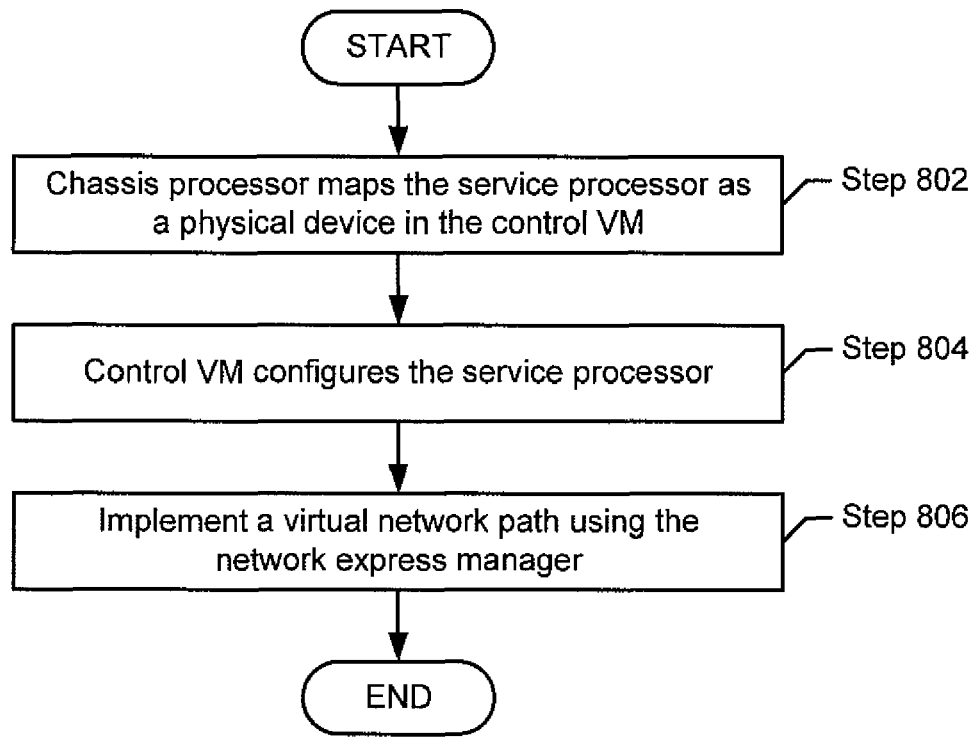
FIG. 8 shows a flowchart of a method for controlling network traffic in a blade chassis in accordance with one or more embodiments of the invention.

FIG. 8 shows a flowchart of a method for controlling network traffic in a blade chassis in accordance with one or more embodiments of the invention. In one or more embodiments of the invention, one or more of the steps shown in FIG. 8 may be omitted, repeated, and/or performed in a different order. Accordingly, embodiments of the invention should not be considered limited to the specific arrangement of steps shown in FIG. 8.

In Step 802, a chassis processor maps a service processor (discussed above) as a physical device in a control virtual machine. In doing so, the chassis processor assigns control of the network express manager (in which the service processor is located) to the control virtual machine. In one or more embodiments of the invention, the control virtual machine has exclusive control of the network express manager. Exclusive control may be enforced, for example, using a security key.

In Step 804, the control virtual machine configures the service processor. For example, as discussed above, the control virtual machine may assign one or more classification policies to the service processor and/or populate and subsequently update a virtual switching table located in the network express manager. In Step 806, after the network express manager has been configured by the control virtual machine, the network express manager is used to implement a virtual network path. The virtual network path includes one or more virtual wires, as discussed above.

Figure 9:
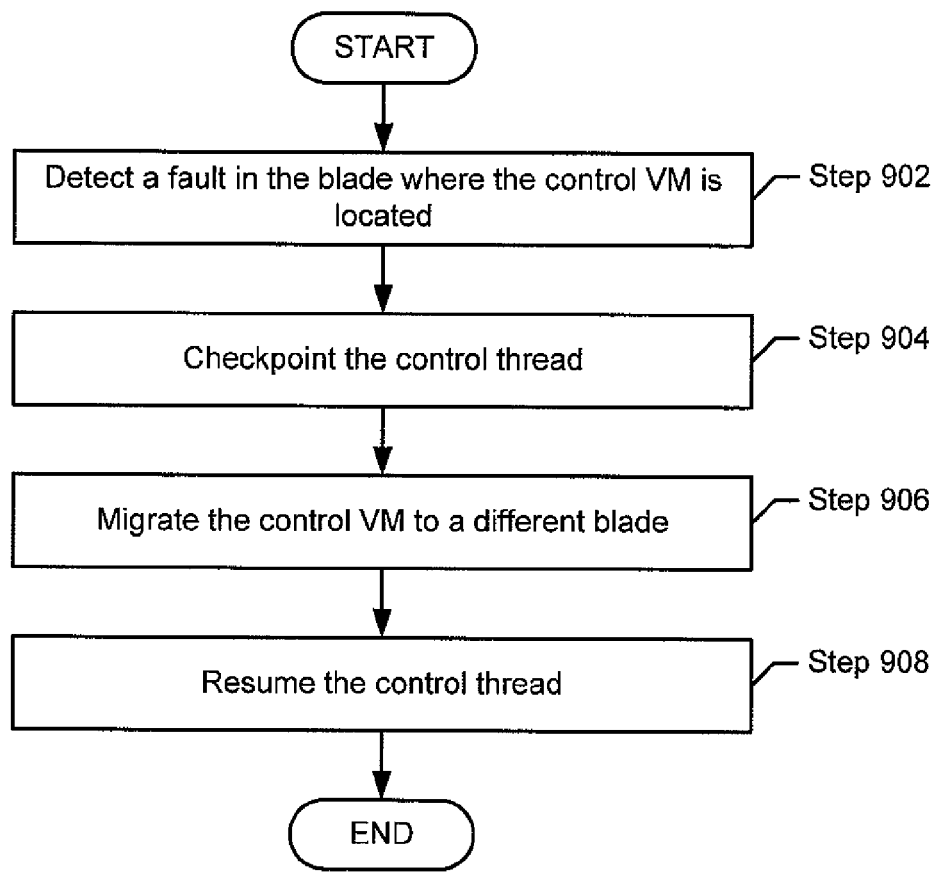
FIG. 9 shows a flowchart of a method for migrating a control virtual machine in accordance with one or more embodiments of the invention.

As noted above, in one or more embodiments of the invention, the control virtual machine may be migrated to a different blade. FIG. 9 shows a flowchart of a method for migrating a control virtual machine in accordance with one or more embodiments of the invention. In one or more embodiments of the invention, one or more of the steps shown in FIG. 9 may be omitted, repeated, and/or performed in a different order. Accordingly, embodiments of the invention should not be considered limited to the specific arrangement of steps shown in FIG. 9.

In one or more embodiments of the invention, the migration is based on a fault in the blade where the control virtual machine is located. Thus, in Step 902, the control virtual machine may detect a fault in the blade. For example, the control virtual machine may detect a bad hard drive sector, a series of dropped network packets, and/or a memory fault.

In one or more embodiments of the invention, the migration is performed without disrupting operation of the network express manager. Specifically, the migration is performed without dropping any network packets flowing over the virtual network path. In one or more embodiments of the invention, this is accomplished by first checkpointing the control thread executing in the control virtual machine (Step 904). In one or more embodiments of the invention, checkpointing the control thread allows the control thread to resume execution on another blade (i.e., the blade to which the control virtual machine is being migrated) from the state it was in prior to the checkpointing. In one or more embodiments of the invention, once the control thread is checkpointed, execution of the control thread is suspended. At this stage, the network express manager continues execution. However, no changes may be made to the operation of the network express manager until the control thread resume execution after the migration. Specifically, the service processor continues to classify incoming packets based on the classification policy previously set by the control thread. In addition, the network express manager continues to implement and enforce the virtual wires (and by extension the virtual network paths) created prior to the checkpointing.

In Step 906, the control virtual machine is migrated to a different blade. In one or more embodiments of the invention, migrating the control virtual machine is performed as follows. First, the control virtual machine notifies the chassis processor that a migration is necessary. The chassis processor determines a new location (i.e., in a different blade) for the control virtual machine, and migrates the control virtual machine to the new location.

In Step 908, if the control thread was checkpointed, the control thread is resumed from the checkpointed state. At this stage, the control virtual machine is once again able to modify the operation of the network express manager. For example, the control thread may updated by the virtual switching table to add, remove, or modify one or more virtual wires. In one or more embodiments of the invention, the above method enables continuous operation of the network express manager during the migration of the control virtual machine.

Figure 10A:
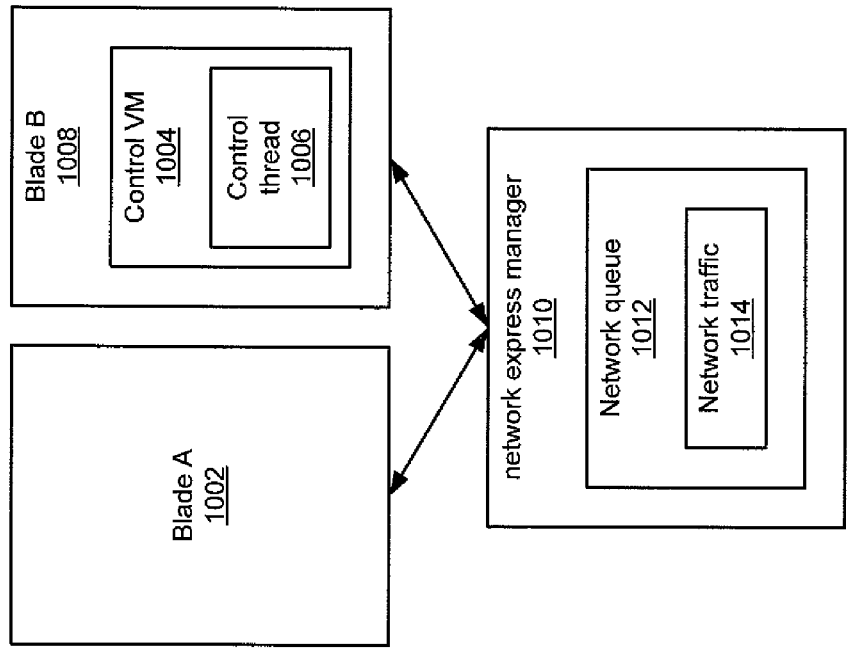
FIGS. 10A-10B show an example of migrating a control virtual machine in accordance with one or more embodiments of the invention.
Figure 10B:
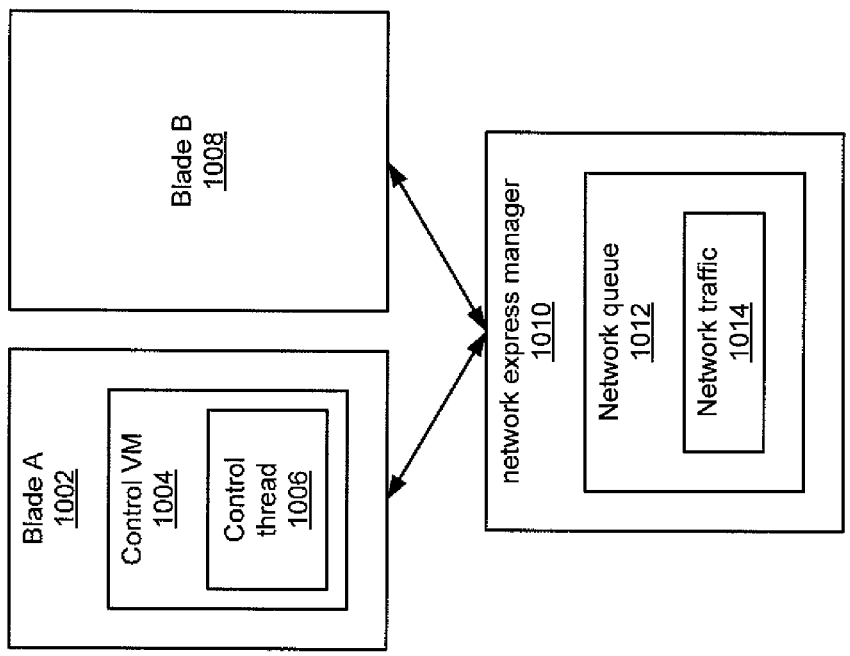

FIGS. 10A-10B show an example of migrating a control virtual machine in accordance with one or more embodiments of the invention. In FIG. 10A, blade A (1002) and blade B (1008) are communicatively coupled with a network express manager (1010) via a chassis interconnect (not shown). The network express manager (1010) includes a network queue (1012) including network traffic (1014) to be routed by the network express manager (1010). Further, the network express manager (1010) is controlled by a control virtual machine (1004) located in blade A (1002). Specifically, the control virtual machine (1004) includes a control thread (1006) for controlling the network express manager (1010).

To migrate the control virtual machine (1004), the control thread (1006) is first checkpointed. After the control virtual machine (1004) is migrated, the control thread (1006) resumes execution. FIG. 10B shows the result of the migration, with the control virtual machine (1004) located in blade B (1008). At this point, if blade A (1002) fails, operation of the control virtual machine (1004) will not be affected. In particular, the network express manager (1010) will continue to process the network traffic (1014) in the network queue (1012).

Embodiments of the invention allow for network traffic in a blade chassis to be controlled using a control virtual machine. Specifically, control of a network express manager located in the blade chassis is assigned to the control virtual machine. Thus, control of the network express manager may be located in a particular blade according to processing availability or some other policy. Further, because control of the network express manager is assigned to the control virtual machine, the control virtual machine may be migrated as needed. For example, the control virtual machine may be migrated if a blade is to be decommissioned, for load balancing purposes, or if a fault is detected in the blade. Further, embodiments of the invention allow for the undisrupted processing of network traffic in the blade chassis during the migration of the control virtual machine.

Those skilled in the art will appreciate that while the invention has been described with respect to using blades, the invention may be extended for use with other computer systems, which are not blades. Specifically, the invention may be extended to any computer, which includes at least memory, a processor, and a mechanism to physically connect to and communicate over the chassis bus. Examples of such computers include, but are not limited to, multi-processor servers, network appliances, and light-weight computing devices (e.g., computers that only include memory, a processor, a mechanism to physically connect to and communicate over the chassis bus), and the necessary hardware to enable the aforementioned components to interact.

Further, those skilled in the art will appreciate that if one or more computers, which are not blades, are not used to implement the invention, then an appropriate chassis may be used in place of the blade chassis.

Software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for controlling network traffic in a chassis, comprising:
   assigning control of a network express manager located in the chassis to a control virtual machine selected from a plurality of virtual machines,
      wherein the plurality of virtual machines is located in a plurality of computers communicatively coupled with each other via a chassis interconnect in the chassis, wherein the chassis interconnect comprises a Peripheral Component Interface Express (PCI-E) backplane comprising a plurality of PCI-E endpoints, wherein a first computer of the plurality of computers connects to the chassis using a first PCI-E endpoint from the plurality of PCI-E endpoints, wherein a second computer of the plurality of computers connects to the chassis using a second PCI-E endpoint from the plurality of PCI-E endpoints,
      wherein each the plurality of virtual machines is associated with at least one of a plurality of virtual network interface cards (VNICs),
      wherein the plurality of computers share a physical network interface, and
      wherein assigning control of the network express manager to the control virtual machine comprises mapping a service processor located in the network express manager as a physical device in the control virtual machine and wherein mapping the service processor is performed by a chassis processor located in the chassis;
   configuring the network express manager, by the control virtual machine, wherein the network express manager is configured to route network traffic in the chassis;
   implementing a virtual network path using the network express manager, and
   migrating, after implementing the virtual network path, the control virtual machine within the plurality of computers without disrupting operation of the network express manager,
   wherein the virtual network path comprises a virtual wire between a first VNIC selected from the plurality of VNICs and a second VNIC selected from the plurality of VNICs,
   wherein the network express manager implements the virtual network path using a virtual switching table,
   wherein the virtual switching table comprises a first mapping of a first Internet Protocol (IP) address for the first VNIC to the first PCI-E endpoint, and a second mapping of a second IP address for the second VNIC to the second PCI-E endpoint,
   wherein the first VNIC is located in the first computer, and
   wherein the second VNIC is located in the second computer.

2. The method of claim 1, further comprising:
   detecting a fault in the first computer, wherein migrating the control virtual machine is initiated based on the fault.

3. The method of claim 1, further comprising:
   checkpointing a control thread in the control virtual machine prior to migrating the control virtual machine; and
   resuming the control thread after migrating the control virtual machine.

4. The method of claim 1, wherein after mapping the service processor the service processor is not visible to any of the plurality of virtual machines other than the control virtual machine.

5. The method of claim 1, wherein each of the plurality of computers is a blade.

6. A blade chassis comprising:
   a chassis interconnect comprising a Peripheral Component Interface Express (PCI-E) backplane comprising a plurality of PCI-E endpoints;
   a physical network interface;
   a network express manager comprising a service processor;
   a plurality of blades communicatively coupled with each other via the chassis interconnect,
      wherein the plurality of blades shares the physical network interface,
      wherein the plurality of blades comprises a plurality of virtual machines, and
      wherein the plurality of virtual machines is associated with a plurality of virtual network interface cards (VNICs); and a chassis processor configured to:
  assign control of the network express manager to a control virtual machine selected from the plurality of virtual machines, wherein assigning control of the network express manager to the control virtual machine comprises mapping the service processor located in the network express manager as a physical device in the control virtual machine and wherein mapping the service processor is performed by a chassis processor located in the chassis,
  migrate within the plurality of blades without disrupting operation of the network express manager,
  wherein controlling the network express manager, by the control virtual machine, comprises configuring the network express manager to route network traffic in the blade chassis, and
  wherein network traffic is routed in the blade chassis over a virtual network path,
  wherein the network express manager implements the virtual network path using a virtual switching table,
  wherein the virtual switching table comprises a first mapping of a first Internet Protocol (IP) address for the first VNIC to a first PCI-E endpoint, and a second mapping of a second IP address for the second VNIC to a second PCI-E endpoint,
  wherein the virtual network path comprises a virtual wire between the a first VNIC selected from the plurality of VNICs and a second VNIC selected from the plurality of VNICs,
  wherein the first VNIC is located in a first blade selected from the plurality of blades,
  wherein the second VNIC is located in a second blade selected from the plurality of blades,
  wherein the first blade connects to the chassis using the first PCI-E endpoint from the plurality of PCI-E endpoints and a second blade connects to the chassis using the second PCI-E endpoint from the plurality of PCI-E endpoints.

7. The blade chassis of claim 6, wherein the control virtual machine is further configured to detect a fault where the control virtual machine is located, and wherein the control virtual machine is configured to migrate based on the fault.

8. The blade chassis of claim 7, wherein the control virtual machine is further configured to:
  checkpoint a control thread in the control virtual machine prior to migrating the control virtual machine; and
  resume the control thread after migrating the control virtual machine.

9. The blade chassis of claim 6, wherein after mapping the service processor the service processor is not visible to any of the plurality of virtual machines other than the control virtual machine.

10. A non-transitory computer readable medium comprising a plurality of executable instructions for controlling network traffic in a blade chassis, wherein the plurality of executable instructions comprises instructions to:
  assign control of a network express manager located in the blade chassis to a control virtual machine selected from a plurality of virtual machines,
    wherein the plurality of virtual machines is located in a plurality of blades communicatively coupled with each other via a chassis interconnect in the blade chassis,
    wherein the chassis interconnect comprises a Peripheral Component Interface Express (PCI-E) backplane comprising a plurality of PCI-E endpoints,
    wherein a first blade of the plurality of blades connects to the blade chassis using a first PCI-E endpoint from the plurality of PCI-E endpoints, wherein a second blade of the plurality of blades connects to the blade chassis using a second PCI-E endpoint from the plurality of PCI-E endpoints,
    wherein each of the plurality of virtual machines is associated with at least one of a plurality of virtual network interface cards (VNICs),
    wherein the plurality of computers share a physical network interface, and
    wherein assigning control of the network express manager to the control virtual machine comprises mapping a service processor located in the network express manager as a physical device in the control virtual machine and wherein mapping the service processor is performed by a chassis processor located in the chassis;
  configure the network express manager, by the control virtual machine, wherein the network express manager is configured to route network traffic in the blade chassis; and
  implement a virtual network path using the network express manager, and
  migrate, after implementing the virtual network path, the control virtual machine within the plurality of computers without disrupting operation of the network express manager,
    wherein the virtual network path further comprises a virtual wire between a first VNIC selected from the plurality of VNICs and a second VNIC selected from the plurality of VNICs,
    wherein the network express manager implements the virtual network path using a virtual switching table,
    wherein the virtual switching table comprises a first mapping of a first Internet Protocol (IP) address for the first VNIC to the first PCI-E endpoint, and wherein the virtual switching table further comprises a second mapping of a second IP address for the second VNIC to the second PCI-E endpoint,
    wherein the first VNIC is located in the first blade, and wherein the second VNIC is located in the second blade.

11. The non-transitory computer readable medium of claim 10, wherein the plurality of executable instructions further comprises instructions to:
  detect a fault in the first blade, wherein instructions to migrate the control virtual machine are executed based on the fault.

12. The non-transitory computer readable medium of claim 10, wherein the plurality of executable instructions further comprises instructions to:
  checkpoint a control thread in the control virtual machine prior to migrating the control virtual machine; and
  resume the control thread after migrating the control virtual machine.

13. The non-transitory computer readable medium of claim 10, wherein instructions to assign control of the network express manager to the control virtual machine comprise instructions to map a service processor located in the network express manager as a physical device in the control virtual machine.

14. The non-transitory computer readable medium of claim 13, wherein instructions to map the service processor are executed by a chassis processor located in the blade chassis.

15. The non-transitory computer readable medium of claim 13, wherein after mapping the service processor the service processor is not visible to any of the plurality of virtual machines other than the control virtual machine.

* * * * *

UNITED STATES PATENT AND TRADEMARK OFFICE
CERTIFICATE OF CORRECTION

PATENT NO. : 8,370,530 B2  
APPLICATION NO. : 11/953832  
DATED : February 5, 2013  
INVENTOR(S) : Sunay Tripathi et al.

Page 1 of 1

It is certified that error appears in the above-identified patent and that said Letters Patent is hereby corrected as shown below:

Title Page, Item (56)

On the right column of the second page, under OTHER PUBLICATIONS, line 2 - 4, a non-patent literature document is cited as "<hub.opensolaris.org/bin/view/Community+Group+advocacy/techdays%2Darchive/02D06%2D07>" and should read as --<hub.opensolaris.org/bin/view/Community+Group+advocacy/techdays%2Darchive%2D06%2D07>--.

Signed and Sealed this  
Ninth Day of April, 2013

Teresa Stanek Rea  
*Acting Director of the United States Patent and Trademark Office*